(12) United States Patent
Yamamoto et al.

(10) Patent No.: US 8,272,235 B2
(45) Date of Patent: Sep. 25, 2012

(54) METHOD FOR PRODUCING ALKALI-FREE GLASS

(75) Inventors: Mineko Yamamoto, Tokyo (JP); Yasuo Hayashi, Tokyo (JP); Hideki Kushitani, Tokyo (JP); Tomoyuki Tsujimura, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/685,715

(22) Filed: Jan. 12, 2010

(65) Prior Publication Data

US 2010/0107697 A1 May 6, 2010

Related U.S. Application Data

(63) Continuation of application No. PCT/JP2008/065215, filed on Aug. 26, 2008.

(30) Foreign Application Priority Data

Aug. 28, 2007 (JP) .................. 2007-220863

(51) Int. Cl.
*C03B 9/00* (2006.01)
*C03C 6/00* (2006.01)

(52) U.S. Cl. ............................................. 65/66; 501/27
(58) Field of Classification Search ............... 65/66
See application file for complete search history.

(56) References Cited

U.S. PATENT DOCUMENTS

| | | | | |
|---|---|---|---|---|
| 5,244,847 A | * | 9/1993 | Kushitani et al. | 501/66 |
| 5,348,916 A | * | 9/1994 | Kushitani et al. | 501/66 |
| 2006/0144091 A1 | * | 7/2006 | Kato et al. | 65/135.6 |
| 2009/0064716 A1 | * | 3/2009 | Sakamoto et al. | 65/33.1 |

FOREIGN PATENT DOCUMENTS

| | | | |
|---|---|---|---|
| EP | 0 599 389 A2 | * | 9/1993 |
| JP | 2001-180967 | | 7/2001 |
| JP | 2003-040641 | | 2/2003 |
| JP | 2004-067408 | | 3/2004 |
| JP | 2004-091244 A | * | 3/2004 |
| JP | 2006-069881 | * | 3/2006 |

OTHER PUBLICATIONS

Online Machine English Translation of JP 2003-040641, printed on May 12, 2010.*
Online Machine English Translation of JP 2004-091244, printed on May 12, 2010.*
English Translation of Written Opinion of the International Searching Authority for PCT/JP2008/065215, printed from www.WIPO.int, on May 12, 2010.*
"Types of Silica Sand Used in Making Glass", Internet Article, pp. 111-113, printed on Dec. 19, 2011.*
Online Machine English Translation of JP 2006-069881, from AIPN Online Japanese Translation, http://dossier1.ipdl.inpit.go.jp/AIPN/odse_top_dn.ipdl?N0000=7400, printed on Dec. 19, 2011.*

* cited by examiner

*Primary Examiner* — Richard Crispino
*Assistant Examiner* — Dionne Walls Mayes
(74) *Attorney, Agent, or Firm* — Oblon, Spivak, McClelland, Maier & Neustadt, L.L.P.

(57) ABSTRACT

To provide a method whereby it is possible to produce an alkali-free glass having little bubbles therein and excellent in homogeneity and flatness.
A method for producing an alkali-free glass, which comprises melting a glass raw material containing a silicon source, followed by forming, wherein as the silicon source, a silica sand is used which has a median particle diameter $D_{50}$ of from 20 μm to 80 μm and which contains particles having a particle diameter of at most 2 μm at a ratio of at most 0.3 vol % and particles having a particle diameter of at least 100 μm at a ratio of at most 2.5 vol %.

18 Claims, 3 Drawing Sheets

Fig. 1(a) Fig. 1(b)
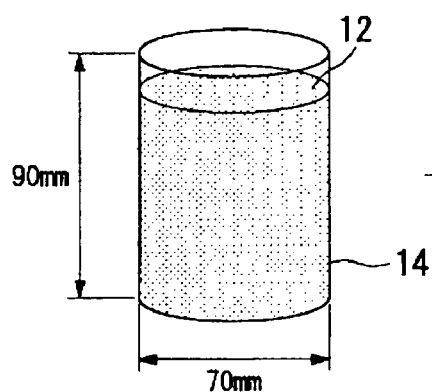 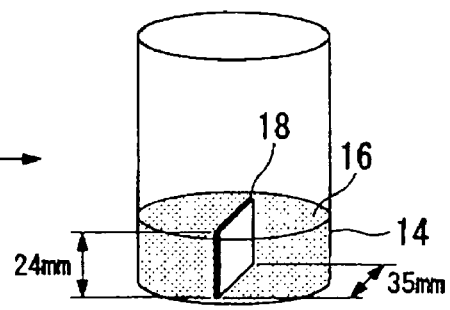
Fig. 2
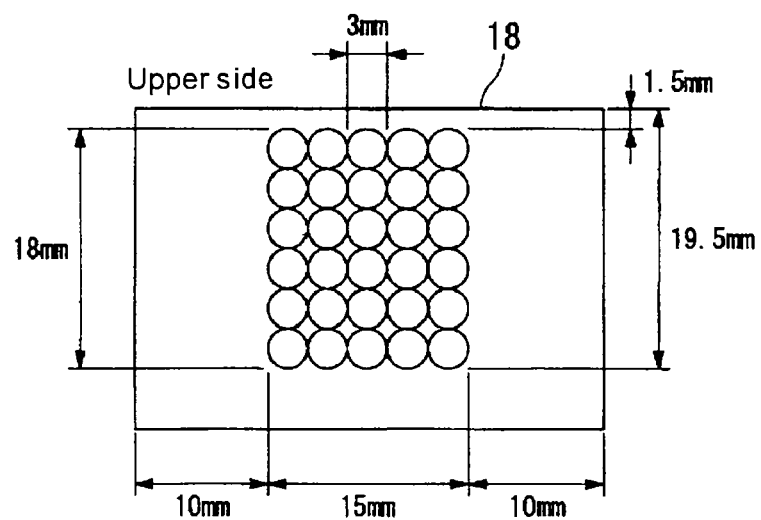

Ratio of particles of at least 100 μm in silica sand (vol%)

Ratio of particles of at least 100 μm in silica sand (vol%)

METHOD FOR PRODUCING ALKALI-FREE GLASS

TECHNICAL FIELD

The present invention relates to a method for producing an alkali-free glass.

BACKGROUND ART

A glass substrate for displays such as liquid crystal display devices is required not to substantially contain alkali metals, and therefore, alkali-free glass is used for such a glass substrate. Further, such a glass substrate is required to have high chemical resistance and durability, to contain little bubbles in the glass and to have high homogeneity and high flatness.

A glass raw material for alkali-free glass does not substantially contain alkali metal compounds, and such a glass raw material is hardly meltable. Therefore, it has heretofore been said that as silica sand being the main component of the glass raw material, it is necessary to employ one having a small particle diameter. However, if a glass raw material containing silica sand having a small particle diameter was melted, there was a case where fine particles of silica sand tended to agglomerate one another to form coarse secondary particles, whereby the glass raw material was not completely melted.

Further, in order to impart the melting properties, chemical resistance and durability to alkali-free glass, $B_2O_3$ may be incorporated to a glass composition. As a raw material for such $B_2O_3$, orthoboric acid (which may also be simply called boric acid) is used, since it is inexpensive and readily available. However, if a glass raw material containing orthoboric acid is employed, fine particles of silica sand tend to be more readily agglomerated. Thus, there was a case where the temperature of molten glass in a melting furnace became unstable, or circulation/residence time of molten glass became unstable.

Once agglomeration of fine particles of silica sand occurs, the homogeneity of molten glass deteriorates, and consequently, the homogeneity and flatness of formed alkali-free glass tend to be low. Further, if the circulation/residence time of molten glass in a melting furnace becomes unstable, there may be a case where a part of molten glass flows out of the melting furnace before bubbles are withdrawn by a clarifier from the molten glass in the melting furnace. Further, melting of the glass raw material is non-uniform, and the effects of the clarifier to silica sand melted belatedly, tend to be inadequate, whereby there may be a case where bubbles are not sufficiently withdrawn from the molten glass.

For the purpose of improving the homogeneity of alkali-free glass, glass raw materials have been proposed wherein the particle diameters of alkaline earth metal compounds (strontium carbonate and dolomite) are controlled (Patent Document 1). However, in the glass raw materials disclosed in Patent Document 1, no consideration is given with respect to silica sand which is melted belatedly. There has been a case where if melting of silica sand delays, silica sand in a non-melted state is captured by bubbles formed in molten glass and gathers in the vicinity of the surface of the molten glass, whereby there will be a difference in the composition of the $SiO_2$ component between the surface layer and other portions of the molten glass, thus leading to a deterioration of the homogeneity of glass.

Patent Document 1: JP-A-2003-40641

DISCLOSURE OF THE INVENTION

Object to be Accomplished by the Invention

The present invention has been made under the above circumstances, and it is an object of the present invention to provide a method whereby it is possible to obtain an alkali-free glass having little bubbles therein and excellent in homogeneity and flatness.

Means to Accomplish the Object

The method for producing an alkali-free glass of the present invention is a method for producing an alkali-free glass, which comprises melting a glass raw material containing a silicon source, followed by forming, wherein as the silicon source, a silica sand is used which has a median particle diameter $D_{50}$ of from 20 μm to 80 μm and which contains particles having a particle diameter of at most 2 μm at a ratio of at most 0.3 vol % and particles having a particle diameter of at least 100 μm at a ratio of at most 2.5 vol %.

Effects of the Invention

By the method for producing an alkali-free glass of the present invention, it is possible to obtain an alkali-free glass having little bubbles therein and excellent in homogeneity and flatness.

BRIEF DESCRIPTION OF THE DRAWINGS

FIG. 1 is a schematic view showing the method for producing an alkali-free glass in Examples.

FIG. 2 is a diagrammatical view showing places in a sample at which the composition was measured.

MEANINGS OF SYMBOLS

Figure 3:
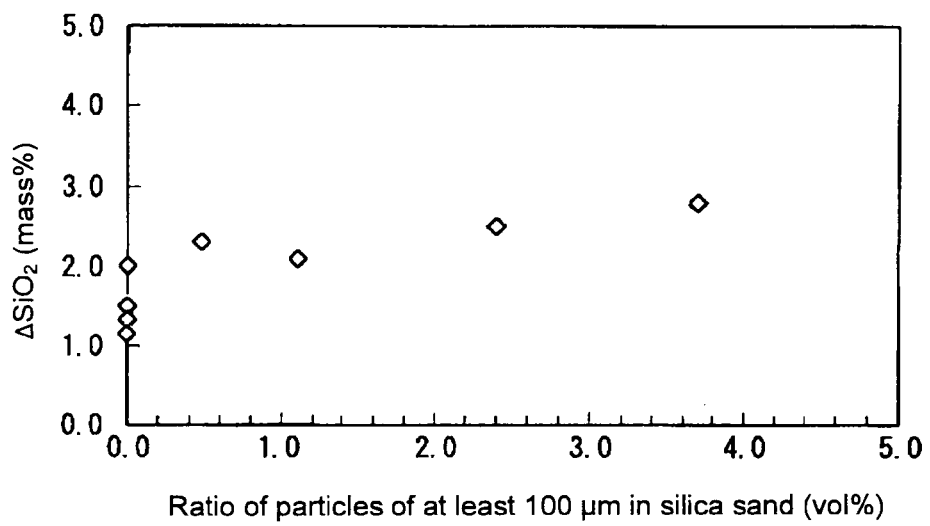
FIG. 3 is a graph showing the relation between the ratio of particles having a particle diameter of at least 100 μm and $\Delta SiO_2$.

12: Glass raw material, 16: alkali-free glass

BEST MODE FOR CARRYING OUT THE INVENTION

Now, the method for producing an alkali-free glass as a practical embodiment of the present invention will be described.

The alkali-free glass according to the present invention is produced by melting a glass raw material containing a silicon source, an alkaline earth metal source and a boron source, followed by forming. Specifically, it is produced, for example, as follows.

(i) A silicon source, an alkaline earth metal source and a boron source, and, if necessary, $Al_2O_3$, a clarifier, etc., are mixed in such proportions as to form a composition of the desired alkali-free glass thereby to prepare a glass raw material.

(ii) Such a glass raw material and, if necessary, a cullet having the same composition as the composition of the desired alkali-free glass, are continuously put into a melting furnace from a glass raw material inlet of the melting furnace and melted at a temperature of from 1,500 to 1,600° C. to obtain molten glass. Here, the cullet is a glass waste discharged in e.g. a process for producing an alkali-free glass.

(iii) Such molten glass is formed by a known forming method such as a float process to have a prescribed thickness.

(iv) The formed glass ribbon is annealed and then cut in a prescribed size to obtain a plate-form alkali-free glass.

Silicon Source

As the silicon source to be incorporated in the glass raw material at the time of producing an alkali-free glass, it is preferred to use a silica sand. The silica sand may be any type so long as it is one to be used for the production of glass. However, particularly in this embodiment, a silica sand is used which has a median particle diameter $D_{50}$ within a range of from 20 µm to 80 µm and which contains particles having a particle diameter of at most 2 µm at a ratio of at most 0.3 vol %, preferably 0 vol %, and particles having a particle diameter of at least 100 µm at a ratio of at most 2.5 vol %.

When the median particle diameter $D_{50}$ of the silica sand is within a range of from 20 µm to 80 µm, the ratio of particles having a particle diameter of at most 2 µm is at most 0.3 vol %, preferably 0 vol %, and the ratio of particles having a particle diameter of at least 100 µm is at most 2.5 vol %, it is possible to readily melt the silica sand while suppressing agglomeration of the silica sand, whereby it is possible to obtain an alkali-free glass having little bubbles and having high homogeneity and flatness.

Further, it is more preferred that the median particle diameter $D_{50}$ of the silica sand is at most 50 µm, since the ratio of particles having a particle diameter of at least 100 µm will not thereby exceed 2.5 vol %. Further, the median particle diameter $D_{50}$ is further preferably at most 30 µm, still further preferably at most 27 µm, particularly preferably at most 25 µm, whereby melting of the silica sand will be more facilitated.

Further, the ratio of particles having a particle diameter of at least 100 µm in the silica sand is particularly preferably 0%, whereby melting of the silica sand will be further facilitated.

In this specification, "particle diameter" is a diameter corresponding to a sphere of silica sand (which is meant for the primary particle diameter in the present invention). Specifically, it is a particle diameter in the particle size distribution of a powder measured by a laser diffraction/scattering method.

Further, in this specification, the "median particle diameter $D_{50}$" is a particle diameter such that in the particle size distribution of a powder measured by a laser diffraction method, the volumetric frequency of particles larger than a certain particle diameter occupies 50% of the volumetric frequency of the entire powder. In other words, it is a particle diameter such that in the particle size distribution of a powder measured by a laser diffraction method, the cumulative frequency is 50%.

Further, in this specification, the "ratio of particles having a particle diameter of at most 2 µm" and "ratio of particles having a particle diameter of at least 100 µm" are determined, for example, by measuring the particle size distribution by a laser diffraction/scattering method.

Further, the silica sand to be used in this embodiment is preferably one having a specific surface area of at least 2,000 cm$^2$/g and at most 8,000 cm$^2$/g, preferably at most 6,500 cm$^2$/g, further preferably at most 5,000 cm$^2$/g. When the specific surface area is at most 8,000 cm$^2$/g, preferably at most 6,500 cm$^2$/g, further preferably at most 5,000 cm$^2$/g, the ratio of fine particles having relatively small particle diameters tends to be small, whereby agglomeration of fine particles one another will be suppressed, and it is possible to obtain an alkali-free glass having little bubbles therein and high homogeneity and flatness.

Boron Source

Now, a boron compound as a boron source may, for example, be orthoboric acid ($H_3BO_3$), metaboric acid ($HBO_2$), tetraboric acid ($H_2B_4O_7$) or boric acid anhydride (anhydrous $B_2O_3$). In the production of usual alkali-free glass, orthoboric acid is employed, since it is readily available.

In the present invention, when boric acid anhydride is used as the boron source, boric acid anhydride is preferably contained in an amount of from 10 to 100 mass % (as calculated as $B_2O_3$) per 100 mass % (as calculated as $B_2O_3$) of the boron source. When boric acid anhydride is at least 10 mass %, agglomeration of the glass raw material will be suppressed, and further it is possible to obtain an effect to reduce bubbles and an effect to improve the homogeneity and flatness. Boric acid anhydride is more preferably within a range of from 20 to 100 mass %, further preferably within a range of from 40 to 100 mass %.

Further, when boric acid anhydride is used as the boron source, it becomes possible to reduce the water content in glass. For example, when silica sand having a median particle diameter $D_{50}$ of at most 50 µm, preferably at most 30 µm, more preferably at most 27 µm, further preferably at most 25 µm, is contained in the glass raw material, the water content in molten glass tends to increase, while the melting property of the silica sand is improved. For example, in a case where a vacuum degassing step is provided between a melting step and a clarifying step for the glass raw material in a float process, water in molten glass serves as a clarifying component to enlarge bubbles and to increase the surfacing speed of bubbles in the vacuum degassing step. However, if the water content becomes excessive, bubbles may not completely be removed even via the vacuum degassing step, and it is possible that the homogeneity and flatness of the alkali-free glass tend to deteriorate. In a case where the water content in molten glass becomes excessive, the water content in glass may be controlled by adding boric acid anhydride as the boron source. For example, in a case where formation of bubbles is likely to be excessive by incorporating silica sand having a median particle diameter $D_{50}$ of at most 50 µm, preferably at most 30 µm, more preferably at most 27 µm, further preferably at most 25 µm to the glass raw material, as mentioned above, it is advisable to use boric acid anhydride as a part or whole of the boron source.

Further, in a case where the glass raw material contains orthoboric acid as the boron source together with an alkaline earth metal compound, it is likely that from orthoboric acid heated at the inlet of the glass raw material, one water molecule is lost to form metaboric acid, and such metaboric acid is liquefied at a temperature of at least 150° C. and contacted with the alkaline earth metal compound, whereby there may be a case where at the inlet of the glass raw material, of the melting furnace, molten orthoboric acid and the alkaline earth metal compound will agglomerate. In order to suppress such agglomeration of metaboric acid and the alkaline earth metal compound, boric acid anhydride may be employed which is in such a state that a water molecule is further lost from metaboric acid. It is thereby possible to obtain an alkali-free glass which has less bubbles and higher homogeneity and flatness.

Alkaline Earth Metal Source

As the alkaline earth metal source, an alkaline earth metal compound may be used. Here, as the alkaline earth metal, at least one element among Mg, Ca, Sr and Ba may be exemplified. And, specific examples of the alkaline earth metal compound include, for example, carbonates such as, $MgCO_3$, $CaCO_3$, $BaCO_3$, $SrCO_3$, $(Mg,Ca)CO_3$ (dolomite), etc., oxides such as MgO, CaO, BaO, SrO, etc., and hydroxides such as $Mg(OH)_2$, $Ca(OH)_2$, $Ba(OH)_2$, $Sr(OH)_2$, etc.

Specifically, as the alkaline earth metal source, it is possible to use, for example, $(Mg,Ca)CO_3$ (dolomite) alone, an alkaline earth metal carbonate alone, a mixture of dolomite and an alkaline earth metal hydroxide, a mixture of alkaline earth metal hydroxide and carbonate, or an alkaline earth metal hydroxide alone. As the carbonate, at least one of $MgCO_3$, $CaCO_3$ and $(Mg,Ca)CO_3$ (dolomite) is preferably used.

Further, a hydroxide may be contained as a part or whole of the alkaline earth metal source. The content of the hydroxide in such a case is not particularly limited, but it is preferably within a range of from 15 to 100 mol % (as calculated as MO, where M is an alkaline earth metal) per 100 mol % (as calculated as MO) of the alkaline earth metal source. When the amount of the hydroxide is at least 15 mol %, it is possible to reduce the non-melted amount of the $SiO_2$ component contained in silica sand at the time of melting the glass raw material thereby to reduce such a trouble that the non-melted $SiO_2$ is taken into bubbles and gathers in the vicinity of the surface of the molten glass, when bubbles are formed in the molten glass. It is thereby possible to avoid formation of a difference in the compositional ratio of $SiO_2$ between the surface layer and other portion of the molten glass and to further improve the homogeneity and flatness of the glass.

As the molar ratio of the hydroxide in the alkaline earth metal source increases, the non-melted amount of the $SiO_2$ component decreases during the melting of the glass raw material. Therefore, the higher the molar ratio of the hydroxide, the better.

As the hydroxide of an alkaline earth metal, it is preferred to use at least one of $Mg(OH)_2$ and $Ca(OH)_2$.

Further, if boric acid anhydride is used as a part or whole of the boron source in the glass raw material in order to reduce the water content in molten glass, as described above, it is possible that the water content in molten glass decreases excessively, bubbles tend to be small in the vacuum degassing step, and the surfacing speed of bubbles tends to be low, whereby the homogeneity and flatness of the alkali-free glass tend to deteriorate. Therefore, in a case where boric acid anhydride is used as a part or whole of the boron source, it is advisable to add an alkali metal hydroxide in order to supplement the water content in molten glass.

Other Materials

As other materials, $Al_2O_3$, etc. may be mentioned. Further, as a clarifier or the like, ZnO, $SO_3$, F, Cl or $SnO_2$ may be incorporated in order to improve the melting property, clarifying property or forming property.

Glass Raw Material

The glass raw material is a powdery mixture obtained by mixing the above-described respective materials.

The composition of the glass raw material is a composition which becomes an alkali-free glass having the desired composition. The composition of the glass raw material is preferably a composition which becomes an alkali-free glass having the after-mentioned composition (1), particularly preferably a composition which becomes an alkali-free glass having the after-mentioned composition (2) or (3).

Alkali-Free Glass

The alkali-free glass to be obtained by the method of the present invention contains $SiO_2$ derived from the silicon source, in its composition. Here, the alkali-free glass is a glass which contains substantially no alkali metal oxide such as $Na_2O$ or $K_2O$.

Now, a preferred composition of the alkali-free glass will be described.

The alkali-free glass is preferably an alkali-free glass having the following composition (1) as represented by mass percentage based on oxides, since it has properties as a glass substrate for displays (thermal expansion coefficient: $25 \times 10^{-7}$ to $60 \times 10^{-7}/°C$., chemical resistance, durability, etc.) and is suitable for forming into a sheet glass:

In alkali-free glass (100 mass %), $SiO_2$: 50 to 66 mass %, $Al_2O_3$: 10.5 to 22 mass %, $B_2O_3$: 5 to 12 mass %, MgO: 0 to 8 mass %, CaO: 0 to 14.5 mass %, SrO: 0 to 24 mass %, BaO: 0 to 13.5 mass %, and MgO+CaO+SrO+BaO: 9 to 29.5 mass % (1)

Further, the alkali-free glass is particularly preferably an alkali-free glass having the following composition (2) as represented by mass percentage based on oxides, since the strain point is at least 640° C., the thermal expansion coefficient and density are small, turbidity by buffered hydrofluoric acid (BHF) to be used for etching, can be suppressed, the durability against a reagent such as hydrochloric acid is excellent, the melting and forming are easy, and it is suitable for forming by a float process:

In alkali-free glass (100 mass %), $SiO_2$: 58 to 66 mass %, $Al_2O_3$: 15 to 22 mass %, $B_2O_3$: 5 to 12 mass %, MgO: 0 to 8 mass %, CaO: 0 to 9 mass %, SrO: 3 to 12.5 mass %, BaO: 0 to 2 mass %, and MgO+CaO+SrO+BaO: 9 to 18 mass % (2)

When $SiO_2$ is adjusted to be at least 58 mass %, the strain point of the alkali-free glass will be improved, the chemical resistance will be good, and the thermal expansion coefficient will decrease. When $SiO_2$ is adjusted to be at most 66 mass %, the melting property of glass will be good, and the devitrification property will be good.

When $Al_2O_3$ is adjusted to be at least 15 mass %, phase separation of the alkali-free glass will be suppressed, the thermal expansion coefficient will decrease, and the strain point will be improved. Further, when $Al_2O_3$ is adjusted to be at most 22 mass %, the melting property of glass will be good.

$B_2O_3$ is effective to suppress turbidity of the alkali-free glass by BHF and to lower the thermal expansion coefficient and density of the alkali-free glass without increasing the viscosity at a high temperature.

When $B_2O_3$ is adjusted to be at least 5 mass %, the BHF resistance of the alkali-free glass will be good. Further, when $B_2O_3$ is adjusted to be at most 12 mass %, the acid resistance of the alkali-free glass will be good, and the strain point will be improved.

MgO is effective to suppress an increase of the thermal expansion coefficient or density of the alkali-free glass and to improve the melting property of the glass raw material.

When MgO is adjusted to be at most 8 mass %, it is possible to suppress turbidity by BHF and to suppress phase separation of the alkali-free glass.

CaO serves to improve the melting property of the glass raw material.

When CaO is adjusted to be at most 9 mass %, the thermal expansion coefficient of the alkali-free glass will be lowered, and the devitrification property will be good.

When SrO is adjusted to be at least 3 mass %, it is possible to suppress phase separation of the alkali-free glass and to suppress turbidity of the alkali-free glass due to BHF. Further, when SrO is adjusted to be at most 12.5 mass %, the thermal expansion coefficient of the alkali-free glass will be lowered.

BaO is effective to suppress the phase separation of the alkali-free glass, to improve the melting property and to improve the devitrification property.

When BaO is adjusted to be at most 2 mass %, the density of the alkali-free glass will be lowered, and the thermal expansion coefficient will be lowered.

When MgO+CaO+SrO+BaO is adjusted to be at least 9 mass %, the melting property of glass will be good. When MgO+CaO+SrO+BaO is adjusted to be at most 18 mass %, the density of the alkali-free glass will be low.

In the composition (2), in order to improve the melting property, clarifying property and forming property, ZnO, $SO_3$, F, Cl and $SnO_2$ may be contained in a total amount of at most 5 mass % in the alkali-free glass (100 mass %). Further, in order to avoid necessity of many steps for treatment of cullet, it is preferred not to contain PbO, $As_2O_3$, $Sb_2O_3$ except for ones unavoidably included as impurities (i.e. not to substantially contain).

Further, the alkali-free glass in the present invention is particularly preferably an alkali-free glass having the following composition (3) as represented by mass percentage based on oxides, since it is excellent in the properties as a glass substrate for displays, is excellent in the reduction resistance, homogeneity and suppression of bubbles and is suitable for forming by a float process:

In alkali-free glass (100 mass %), $SiO_2$: 50 to 61.5 mass %, $Al_2O_3$: 10.5 to 18 mass %, $B_2O_3$: 7 to 10 mass %, MgO: 2 to 5 mass %, CaO: 0 to 14.5 mass %, SrO: 0 to 24 mass %, BaO: 0 to 13.5 mass %, and MgO+CaO+SrO+BaO: 16 to 29.5 mass % (3)

When $SiO_2$ is adjusted to be at least 50 mass %, the acid resistance of the alkali-free glass will be good, the density will be lowered, the strain point will be improved, the thermal expansion coefficient will be lowered, and the Young's modulus will be improved. When $SiO_2$ is adjusted to be at most 61.5 mass %, the devitrification property of the alkali-free glass will be good.

When $Al_2O_3$ is adjusted to be at least 10.5 mass %, it is possible to suppress phase separation of the alkali-free glass, to increase the strain point and to improve the Young's modulus. Further, when $Al_2O_3$ is adjusted to be at most 18 mass %, the devitrification property, acid resistance and BHF resistance of the alkali-free glass will be good.

When $B_2O_3$ is adjusted to be at least 7 mass %, it is possible to lower the density of the alkali-free glass, to improve the BHF resistance, to improve the melting property, to improve the devitrification property and to lower the thermal expansion coefficient. Further, when $B_2O_3$ is adjusted to be at most 10 mass %, the strain point of the alkali-free glass will be improved, the Young's modulus will be increased, and the acid resistance will be good.

When MgO is adjusted to be at least 2 mass %, it is possible to lower the density of the alkali-free glass, and to improve the melting property without increasing the thermal expansion coefficient or without excessively lowering the strain point. Further, when MgO is adjusted to be at most 5 mass %, it is possible to suppress phase separation of the alkali-free glass, whereby the devitrification property, acid resistance and BHF resistance will be good.

CaO is effective to improve the melting property without increasing the density of the alkali-free glass, without increasing the thermal expansion coefficient and without excessively lowering the strain point.

When CaO is adjusted to be at most 14.5 mass %, the devitrification property of the alkali-free glass will be good, the thermal expansion coefficient will be lowered, the density will be lowered, and the acid resistance and alkali resistance will be good.

SrO is effective to improve the melting property without increasing the density of the alkali-free glass, without increasing the thermal expansion coefficient and without excessively lowering the strain point.

When SrO is adjusted to be at most 24 mass %, the devitrification property of the alkali-free glass will be good, the thermal expansion coefficient will be lowered, the density will be lowered, and the acid resistance and alkali resistance will be good.

BaO is effective to suppress phase separation of the alkali-free glass, to improve the devitrification property and to improve the chemical resistance.

When BaO is adjusted to be at most 13.5 mass %, the density of the alkali-free glass will be lowered, the thermal expansion coefficient will be lowered, the Young's modulus will be increased, the melting property will be good, and the BHF resistance will be good.

When MgO+CaO+SrO+BaO is adjusted to be at least 16 mass %, the melting property of glass will be good. When MgO+CaO+SrO+BaO is adjusted to be at most 29.5 mass %, the density and the thermal expansion coefficient of the alkali-free glass will be lowered.

In the composition (3), in order to improve the melting property, clarifying property and forming property, ZnO, $SO_3$, F, Cl and $SnO_2$ may be contained at most 5 mass % in total in the alkali-free glass (100 mass %). Further, in order to avoid necessity of many steps for treatment of cullet, it is preferred not to contain PbO, $As_2O_3$ and $Sb_2O_3$ except for ones unavoidably included as impurities, etc. (i.e. not to substantially contain them).

EXAMPLES

Examples 1 to 8 and Comparative Examples 1 to 6

In order to obtain an alkali-free glass having a composition (composition 1) comprising 59 mass % of $SiO_2$, 18 mass % of $Al_2O_3$, 8 mass % of $B_2O_3$, 3 mass % of MgO, 4 mass % of CaO and 8 mass % of SrO or a composition (composition 2) comprising 60 mass % of $SiO_2$, 17 mass % of $Al_2O_3$, 8 mass % of $B_2O_3$, 5 mass % of MgO, 6 mass % of CaO and 4 mass % of SrO, as represented by mass percentage based on oxides, a silicon source, an alkaline earth metal source, a boron source and other materials were adjusted to prepare a glass matrix composition raw material and further, as a clarifying agent, Cl was mixed in a concentration of from 0.7 to 1.0 mass %, to 100 mass % after vitrification of the glass matrix composition raw material, to obtain a glass raw material.

As the silicon source, silica sands 1 to 11 as shown in the following Table 1 were used. Here, the particle size of silica sand was determined by measuring the particle size distribution by a laser diffraction/scattering method (HORIBA LA950WET). Further, in Table 1, for example, the item for ">10 μm (vol %)" indicates a ratio of particles exceeding 10 μm, contained in silica sand. Further, the item for "$D_5$ (μm)" indicates a particle diameter when the cumulative frequency is 5 vol %. Further, the item for "$D_{50}$ (μm)" indicates a particle diameter (median particle diameter $D_{50}$) when the cumulative frequency is 50 vol %. Further, the specific surface area is a calculated value obtained from the results of measuring the particle size distribution based on the assumption that the particles are spherical.

Further, as the alkaline earth metal source, dolomite, strontium carbonate and partially magnesium hydroxide-containing MgO were used.

Further, as the boron source, orthoboric acid ($H_3BO_3$) was used in Examples 1 to 5 and Comparative Examples 1 to 6, and boric acid anhydride was used in Examples 6 to 8. Further, in Example 1, as a clarifier, Cl was mixed in a concentration of 1.0 mass % to 100 mass % after vitrification of the raw material, and also in other Examples, 1.0 mass % of Cl was mixed.

In the following Table 2, silica sands and glass compositions used in Examples 1 to 8 and Comparative Examples 1 to 6 are summarized.

Then, as shown in FIG. 1(a), the glass raw material 12 in such an amount that the mass after vitrification would be 250 g, was put in a crucible 14 made of platinum rhodium and having a bottomed cylindrical shape having a height of 90 mm and an outer diameter of 70 mm. Such a crucible 14 was put in a heating furnace and heated for one hour at 1,550° C. (the temperature at which the glass viscosity η corresponds to log η=2.5) while air with a dew point of 80° C. was blown in from a side of the heating furnace without forcibly stirring the inside of the crucible 14, thereby to melt the glass raw material 12. The molten glass was cooled together with the crucible 14, and then, as shown in FIG. 1(b), a sample 18 of 24 mm×35 mm×1 mm in thickness was cutout from the center portion of the alkali-free glass 16 in the crucible 14.

As shown in FIG. 2, with respect to the region of 18 mm×15 mm (upper margin: 1.5 mm, right and left margins: 10 mm) at the center portion of the sample 18 of 24 mm×35 mm, a fluorescent X-ray beam with a diameter of 3 mm was applied to a total of 30 places i.e. 6 places in length×5 places in width, whereby the compositions of alkali-free glass were measured at the respective places.

Among the compositions at 30 places, the minimum value of $SiO_2$ (mass %) was subtracted from the maximum value of $SiO_2$ (mass %) to obtain the composition difference ($\Delta SiO_2$).

Further, with respect to the region of 24 mm×10 mm at the center portion of the sample 19, the number of bubbles remaining in glass was counted to obtain the number of bubbles per 1 kg of the glass.

Further, a ratio of silica sand (non-melted $SiO_2$) remained without being melted at the time of melting the glass, was obtained. Such non-melted $SiO_2$ was determined in such a manner that 250 g of the raw material was put on a platinum board of 400 mm in length×20 mm in width and heated for one hour in a furnace with a temperature gradient of from 800 to 1,500° C., whereupon the non-melted $SiO_2$ was measured by the area occupied by silica sand remaining on the glass surface in a temperature range of from 1,400 to 1,500° C. These results are also shown in Table 2.

TABLE 1

| | | Silica sand 1 | Silica sand 2 | Silica sand 3 | Silica sand 4 | Silica sand 5 | Silica sand 6 | Silica sand 7 | Silica sand 8 | Silica sand 9 | Silica sand 10 | Silica sand 11 |
|---|---|---|---|---|---|---|---|---|---|---|---|---|
| Particle size | >212 μm (vol %) | 0 | 0 | 0 | 0 | 0 | 0 | 0.4 | 0 | 0.2 | 0 | 0 |
| | >176 μm (vol %) | 0 | 0 | 0 | 0 | 0 | 0.2 | 1.0 | 0 | 0.3 | 0 | 0 |
| | >150 μm (vol %) | 0 | 0 | 0.1 | 0.1 | 0.2 | 0.5 | 1.8 | 0 | 0.3 | 0 | 0 |
| | ≧100 μm (vol %) | 0 | 0.48 | 1.0 | 2.3 | 3.5 | 3.6 | 6.1 | 0 | 0.3 | 0 | 0 |
| | >75 μm (vol %) | 0.5 | 1.8 | 8.2 | 13.9 | 31.1 | 14.9 | 16.0 | 0 | 0.3 | 0.4 | 0.25 |
| | >10 μm (vol %) | 98.1 | 100 | 100 | 100 | 100 | 100 | 82.4 | 42.9 | 46.4 | 87.1 | 70.7 |
| | >5 μm (vol %) | 99.9 | 100 | 100 | 100 | 100 | 100 | 88.0 | 82.8 | 65.6 | 96.7 | 91.7 |
| | >2 μm (vol %) | 100 | 100 | 100 | 100 | 100 | 100 | 95.8 | 99.1 | 82.7 | 100 | 100 |
| | >1 μm (vol %) | 100 | 100 | 100 | 100 | 100 | 100 | 97.6 | 99.3 | 84.7 | 100 | 100 |
| | >0.1 μm (vol %) | 100 | 100 | 100 | 100 | 100 | 100 | 100 | 99.97 | 100 | 100 | 100 |
| | $D_1$ (μm) | 8.0 | 18.9 | 15.0 | 15.0 | 35.9 | 19.9 | 0.7 | 2.1 | 0.3 | 6.8 | 5.1 |
| | $D_2$ (μm) | 10 | 21 | 21 | 21 | 39 | 22.1 | 0.9 | 3 | 0.3 | 9 | 6 |
| | $D_5$ (μm) | 13 | 24 | 25 | 26 | 44 | 26.5 | 2 | 3 | 0.4 | 11 | 8 |
| | $D_{10}$ (μm) | 16 | 27 | 29 | 30 | 48 | 30.8 | 4 | 4 | 0.5 | 14 | 10 |
| | $D_{20}$ (μm) | 20 | 31 | 34 | 36 | 54 | 36.9 | 13 | 5 | 3 | 17 | 13 |
| | $D_{50}$ (μm) | 27 | 39 | 46 | 49 | 66 | 51.4 | 39 | 9 | 9 | 23 | 18 |
| | $D_{70}$ (μm) | 33 | 45 | 55 | 61 | 76 | 63.5 | 59 | 12 | 16 | 29 | 23 |
| | $D_{80}$ (μm) | 37 | 50 | 62 | 68 | 82 | 72 | 68 | 14 | 19 | 33 | 26 |
| | $D_{90}$ (μm) | 44 | 57 | 72 | 81 | 91 | 85.4 | 89 | 17 | 24 | 39 | 31 |
| | $D_{99}$ (μm) | 69 | 81 | 106 | 124 | 102 | 135 | 175 | 25 | 40 | 60 | 47 |
| | Specific surface area ($cm^2 \cdot g^{-1}$) | 4214 | 2714 | 2401 | 2230 | 1590 | 2151 | 10663 | 14683 | 50123 | 5014 | 6215 |

TABLE 2

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Silica sand used | Silica sand 1 | Silica sand 2 | Silica sand 3 | Silica sand 4 | Silica sand 1 | Silica sand 1 | Silica sand 10 | Silica sand 11 |
| Glass composition | Composition 1 | Composition 1 | Composition 1 | Composition 1 | Composition 2 | Composition 1 | Composition 1 | Composition 1 |
| $\Delta SiO_2$ (mass %) | 2.0 | 2.3 | 2.1 | 2.5 | 1.8 | 1.5 | 1.3 | 1.1 |
| Area of non-melted silica sand (%) | 18 | 11 | 20 | 22 | 10 | 10 | 9 | 7 |
| Number of bubbles (×$10^5$ bubbles·$kg^{-1}$) | 3 | 3.5 | 4.3 | 4.8 | 3 | 2.7 | 2.0 | 1.8 |

TABLE 2-continued

|  | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- |
| Silica sand used | Silica sand 5 | Silica sand 6 | Silica sand 7 | Silica sand 8 | Silica sand 9 | Silica sand 6 |
| Glass composition | Composition 1 | Composition 1 | Composition 1 | Composition 1 | Composition 1 | Composition 2 |
| $\Delta SiO_2$ (mass %) | 2.8 | 3.3 | 4.1 | 3.8 | 5.2 | 3.2 |
| Area of non-melted silica sand (%) | 42 | 44 | 60 | 43 | 43 | 25 |
| Number of bubbles ($\times 10^5$ bubbles · kg$^{-1}$) | 9.2 | 10 | 10 | 1.3 | 0.8 | 5.1 |

When $\Delta SiO_2$ in glass is at most 2.5 mass %, and the area of non-melted silica sand is at most 25%, the glass is excellent in the homogeneity and flatness. Further, the number of bubbles in glass may suitably be at most 500,000. Accordingly, as shown in Tables 1 and 2, in each of Examples 1 to 8 wherein silica sands 1 to 4, 10 and 11 are used as a material wherein the ratio of particles having a particle diameter of at most 2 μm is 0 vol %, and the ratio of particles having a particle diameter of at least 100 μm is at most 2.5 vol %, $\Delta SiO_2$ and the area of non-melted silica sand are small, and it is evident that the glass is excellent in homogeneity. Further, the number of bubbles is also small. Further, the specific surface areas of silica sands 1 to 4 and 10 and 11 used in Examples 1 to 8 are within a range of from 2,000 to 8,000 cm$^2$·g$^{-1}$, and it is evident that with a silica sand having a specific surface area within this range, it is possible to obtain a glass wherein $\Delta SiO_2$, the area of non-melted silica sand and the number of bubbles are small.

On the other hand, in Comparative Examples 1 to 6, $\Delta SiO_2$ exceeds 2.5 mass %, and the area of non-melted silica sand is larger than in Examples 1 to 5, whereby it is evident that such glass is poor in homogeneity as compared with Examples 1 to 5. Further, in Comparative Examples 1 to 3 and 6, the number of bubbles also exceeds 500,000 bubbles kg$^{-1}$, and it is evident that the number of bubbles is large as compared with Examples. The reason is considered to be such that in Comparative Examples 1 to 6, the ratio of particles having a particle size of at most 2 μm or the ratio of particles having a particle size of at least 100 μm is large in silica sands 5 to 9, whereby fine particles of silica sand agglomerated, and melting was prevented, or particles having excessively large particle sizes were contained, whereby the silica sand became hardly meltable.

Figure 4:
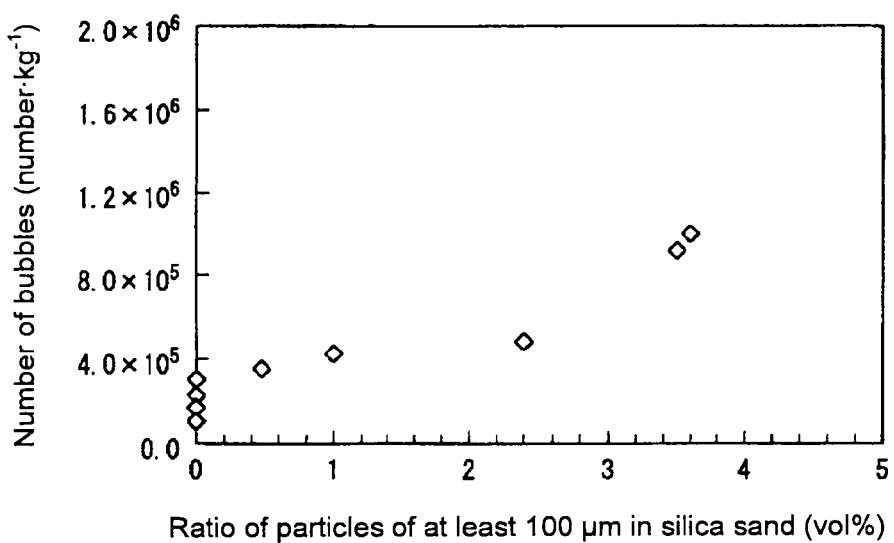
FIG. 4 is a graph showing the relation between the ratio of particles having a particle diameter of at most 100 μm and the number of bubbles.
Figure 5:
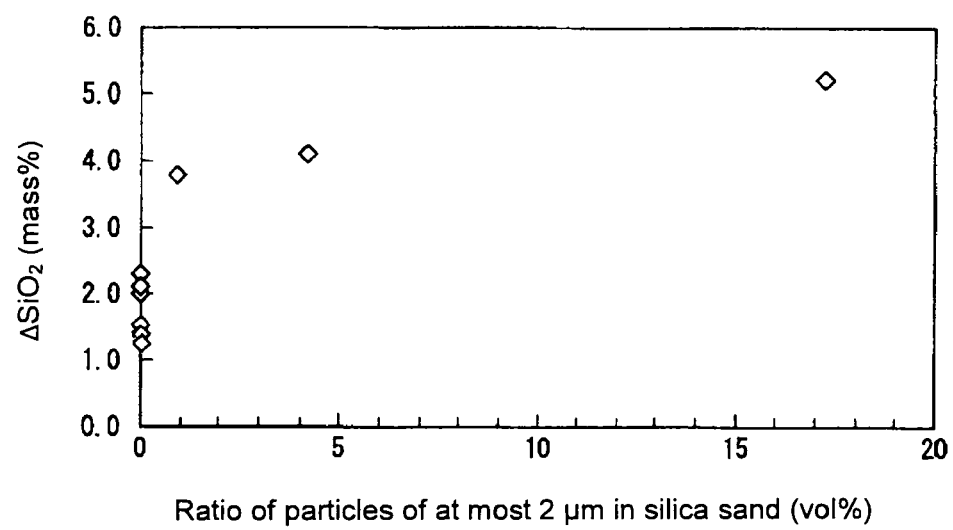
FIG. 5 is a graph showing the relation between the ratio of particles having a particle diameter of at most 2 μm and $\Delta SiO_2$.

Further, the relations between the ratio of particles having a particle diameter of at least 100 μm in composition 1 and $\Delta SiO_2$ and the number of bubbles, are shown in FIGS. 3 and 4, and the relation between the ratio of particles having a particle diameter of at most 2 μm and $\Delta SiO_2$ is shown in FIG. 5.

As shown in FIGS. 3 and 4, it is evident that as the ratio of particles having a particle diameter of at least 100 μm increases, $\Delta SiO_2$ and the number of bubbles increase. Particularly as shown in FIG. 3, $\Delta SiO_2$ is substantially in a linear relation with the ratio of particles having a particle diameter of at least 100 μm, and it is evident that in order to adjust $\Delta SiO_2$ to be at most 2.5 mass %, the ratio of particles having a particle diameter of at least 100 μm may be made to be at most 2.5 vol %.

Further, as shown in FIG. 5, as the ratio of particles having a particle diameter of at most 2 μm increases, $\Delta SiO_2$ increases, whereby it is evident that in order to adjust $\Delta SiO_2$ to be at most 2.5 mass %, the ratio of particles having a particle diameter of at most 2 μm may be made to be at most 0.3 vol %, preferably 0 vol %.

INDUSTRIAL APPLICABILITY

The alkali-free glass obtained by the present invention contains little bubbles in the glass and is excellent in homogeneity and flatness, and thus it is widely useful as e.g. a glass substrate for displays such as liquid crystal display devices.

The entire disclosure of Japanese Patent Application No. 2007-220863 filed on Aug. 28, 2007 including specification, claims, drawings and summary is incorporated herein by reference in its entirety.

What is claimed is:

1. A method for producing an alkali-free glass, which comprises
melting a glass raw material containing a silicon source, followed by forming,
wherein as the silicon source, a silica sand is used which has a median particle diameter $D_{50}$ of 18 to 27 μm, and which contains primary particles having a particle diameter of at most 2 μm at a ratio of at most 0.3 vol % and particles having a particle diameter of at least 100 μm at a ratio of at most 2.5 vol %, and
wherein the glass raw material contains, as a boron source, boric acid anhydride in an amount of from 10 to 100 mass % per 100 mass % (as calculated as $B_2O_3$) of the boron source.

2. The method for producing an alkali-free glass according to claim 1, wherein the ratio of the primary particles having a particle diameter of at most 2 μm is 0 vol %.

3. The method for producing an alkali-free glass according to claim 1, wherein the glass raw material is a glass raw material which becomes an alkali-free glass having the following composition (1) as represented by mass percentage based on oxides:
$SiO_2$: 50 to 66 mass %, $Al_2O_3$: 10.5 to 22 mass %, $B_2O_3$: 5 to 12 mass %, MgO: 0 to 8 mass %, CaO: 0 to 14.5 mass %, SrO: 0 to 24 mass %, BaO: 0 to 13.5 mass %, and MgO+CaO+SrO+BaO: 9 to 29.5 mass % (1).

4. The method of claim 3, wherein the forming forms a silica glass having a $\Delta SiO_2$ of less than 2.1 mass %.

5. The method of claim 3, wherein the forming forms a silica glass having a $\Delta SiO_2$ of at most 2.0 mass %.

6. The method for producing an alkali-free glass according to claim 1, wherein the glass raw material is a glass raw material which becomes an alkali-free glass having the following composition (2) as represented by mass percentage based on oxides:

SiO$_2$: 58 to 66 mass %, Al$_2$O$_3$: 15 to 22 mass %, B$_2$O$_3$: 5 to 12 mass %, MgO: 0 to 8 mass %, CaO: 0 to 9 mass %, SrO: 3 to 12.5 mass %, BaO: 0 to 2 mass %, and MgO+CaO+SrO+BaO: 9 to 18 mass % (2).

7. The method for producing an alkali-free glass according to claim 1, wherein the glass raw material is a glass raw material which becomes an alkali-free glass having the following composition (3) as represented by mass percentage based on oxides:

SiO$_2$: 50 to 61.5 mass %, Al$_2$O$_3$: 10.5 to 18 mass %, B$_2$O$_3$: 7 to 10 mass %, MgO: 2 to 5 mass %, CaO: 0 to 14.5 mass %, SrO: 0 to 24 mass %, BaO: 0 to 13.5 mass %, and MgO+CaO+SrO+BaO: 16 to 29.5 mass % (3).

8. The method of claim 1, wherein the median particle diameter D$_{50}$ of the silica sand is 25 μm to 27 μm.

9. The method of claim 1, wherein the median particle diameter D$_{50}$ of the silica sand is 23 μm to 27 μm.

10. The method of claim 1, wherein the forming forms a silica glass having less than 3.1 ×10$^5$ bubbles/kg.

11. The method of claim 1, wherein the forming forms a silica glass having at most 3 ×10$^5$ bubbles/kg.

12. The method of claim 1, wherein the glass raw material contains boric acid anhydride in an amount of 20 to 100 mass % per 100 mass % of the boron source.

13. The method of claim 1, wherein the glass raw material contains boric acid anhydride in an amount of from 40 to 100 mass % per 100 mass % of the boron source.

14. The method of claim 1, wherein the forming includes a degassing step.

15. The method of claim 1, wherein the forming forms a boron-comprising silicon glass comprising 59-60 mass % of SiO$_2$, 17-18 mass % Al$_2$O$_3$, 3-5 mass % of MgO, 4-6 mass % of CaO and 4-8 mass % of SrO.

16. A glass substrate made by the method of claim 1.

17. The method of claim 1, wherein the median particle diameter D$_{50}$ of the silica sand is from 20 to 27 μm.

18. The method of claim 1, wherein the silica sand contains primary particles having a particle diameter of at most 2 μm at a ratio of 0%.

* * * * *